United States Patent
Korba et al.

(10) Patent No.: US 8,497,602 B2
(45) Date of Patent: Jul. 30, 2013

(54) TIME DELAY COMPENSATION IN POWER SYSTEM CONTROL

(75) Inventors: Petr Korba, Turgi (CH); Rafael Segundo, Zamora (MX); Bertil Berggren, Vasteras (SE); Andrew D. Paice, Daettwil (CH); Rajat Majumder, Raleigh, NC (US)

(73) Assignee: ABB Research Ltd, Zurich (CH)

( * ) Notice: Subject to any disclaimer, the term of this patent is extended or adjusted under 35 U.S.C. 154(b) by 416 days.

(21) Appl. No.: 12/952,906

(22) Filed: Nov. 23, 2010

(65) Prior Publication Data

US 2011/0126038 A1    May 26, 2011

Related U.S. Application Data

(63) Continuation of application No. PCT/EP2009/055974, filed on May 18, 2009.

(30) Foreign Application Priority Data

May 23, 2008    (EP) ..................... 08156785

(51) Int. Cl.
*H02J 1/00* (2006.01)
*H02M 1/00* (2007.01)
(52) U.S. Cl.
USPC ...................................................... 307/105
(58) Field of Classification Search
USPC ............................................... 307/105
See application file for complete search history.

(56) References Cited

U.S. PATENT DOCUMENTS

| 5,063,532 | A | 11/1991 | Takeda et al. |
| 2003/0062776 | A1 | 4/2003 | Skibinski et al. |
| 2004/0010350 | A1 | 1/2004 | Lof et al. |
| 2004/0090725 | A1 | 5/2004 | Rehtanz et al. |

FOREIGN PATENT DOCUMENTS

| EP | 0 330 755 A2 | 9/1989 |
| EP | 1 416 603 A1 | 5/2004 |
| WO | WO 01/93405 A | 12/2001 |

OTHER PUBLICATIONS

Sadikovic et al., "Application of FACTS Devices for Damping of Power System Oscillations", Proceedings of the Power Tech Conference, Jun. 2005.
International Search Report (PCT/ISA/210) issued on Oct. 27, 2009, by European Patent Office as the International Searching Authority for International Application No. PCT/EP2009/055974.
Written Opinion (PCT/ISA/237) issued on Oct. 27, 2009, by European Patent Office as the International Searching Authority for International Application No. PCT/EP2009/055974.
Search Report issued on Dec. 29, 2008, by European Patent Office for Application No. 08156785.1.
Korba et al., "Towards Real-time Implementation of Adaptive Damping Controllers for FACTS Devices", Power Engineering Society General Meeting, IEEE, Jun. 2007, pp. 1-6.

*Primary Examiner* — Hal Kaplan
(74) *Attorney, Agent, or Firm* — Buchanan Ingersoll & Rooney PC

(57) ABSTRACT

A method and controller are provided for the compensation of time delays in remote feedback signals in power system control. The method includes converting the time delay into a phase shift and calculating four compensation angles from the phase shift. The optimal compensation angle is determined and applied to the remote feedback signals. A technique of equipping a controller with a global clock is also disclosed.

17 Claims, 9 Drawing Sheets

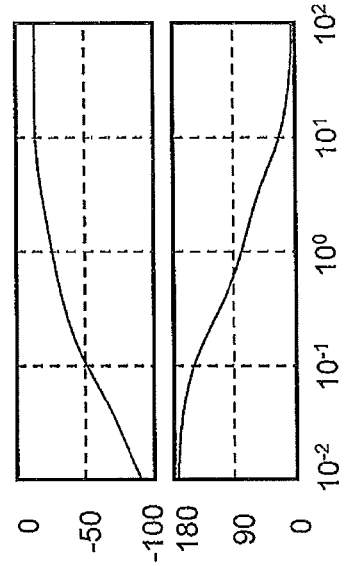
FIG. 5a
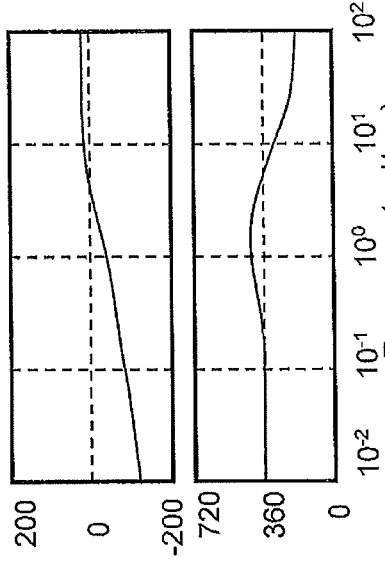
FIG. 5b
FIG. 5c
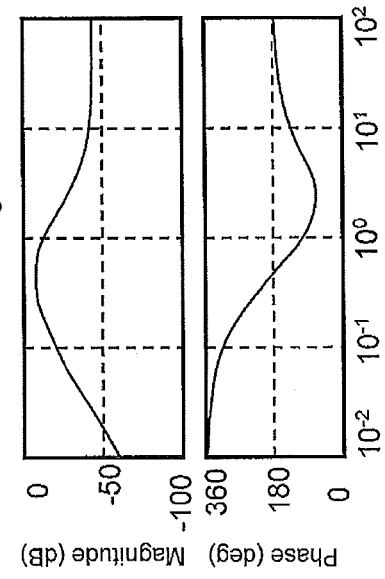
FIG. 5d

TIME DELAY COMPENSATION IN POWER SYSTEM CONTROL

RELATED APPLICATIONS

This application claims priority as a continuation application under 35 U.S.C. §120 to PCT/EP2009/055974, which was filed as an International Application on May 18, 2009 designating the U.S., and which claims priority to European Application 08156785.1 filed in Europe on May 23, 2008. The entire contents of these applications are hereby incorporated by reference in their entireties.

FIELD

The present disclosure relates to the field of controlling controllable devices in electric power systems interconnecting a plurality of generators and consumers. For example, exemplary embodiments of the present disclosure are directed to controlling multimode electromechanical oscillations, in which the controller utilizes feedback signals.

BACKGROUND INFORMATION

In the wake of the ongoing deregulations of the electric power markets, load transmission and wheeling of power from distant generators to local consumers has become common practice. Due to the competition between power producing companies and the emerging need to optimize assets, increased amounts of electric power are transmitted through the existing networks, frequently causing congestion due to transmission bottlenecks. Transmission bottlenecks can be handled by introducing transfer limits on transmission interfaces. This improves system security, but it also implies that more costly power production has to be connected while less costly production is disconnected from the grid. Thus, transmission bottlenecks can have a substantial cost to the society. If transfer limits are not respected, system security is degraded which may imply disconnection of a large number of customers or even complete blackouts in the event of credible contingencies.

An underlying physical cause of transmission bottlenecks is often related to the dynamics of the power system. A number of dynamic phenomena need to be avoided in order to certify sufficiently secure system operation, such as loss of synchronism, voltage collapse and growing electromechanical oscillations. In this regard, electrical transmission networks are highly dynamic and employ control systems and feedback to improve performance and increase transfer limits.

With reference to unwanted electromechanical oscillations that occur in parts of the power network, they generally have a frequency of less than a few Hz and are considered acceptable as long as they decay fast enough. They are initiated by, for example, normal changes in the system load or switching events in the network possibly following faults, and they are a characteristic of any power system. However, insufficiently damped oscillations may occur when the operating point of the power system is changed, for example, due to a new distribution of power flows following a connection or disconnection of generators, loads and/or transmission lines. In these cases, an increase in the transmitted power of a few megawatts (MW) may make the difference between stable oscillations and unstable oscillations which have the potential to cause a system collapse or result in loss of synchronism, loss of interconnections and ultimately the inability to supply electric power to the customer. Appropriate monitoring and control of the power system can be helpful for a network operator to accurately assess power system states and avoid a total blackout by taking appropriate actions such as the connection of specially designed oscillation damping equipment.

It has been found that electromechanical oscillations in electric power networks also take the form of a superposition of multiple oscillatory modes. These multiple oscillatory modes create similar problems to the single mode oscillations and thus have the potential to cause a collapse of the electric power network. Furthermore, in situations where a Power Oscillation Damping (POD) controller is used to stabilize a single selected oscillatory mode, this may often have the effect of destabilizing the other oscillatory modes present, for example, a second dominant mode, which is subsequently damped less than the first dominant mode.

Generally, power networks utilize so-called lead-lag controllers to improve undesirable frequency responses. Such a controller functions either as a lead controller or a lag controller at any given time point. In both cases, a pole-zero pair is introduced into an open loop transfer function. The transfer function can be written in the Laplace domain as:

$$\frac{Y}{X} = \frac{s-z}{s-p}$$

where X is the input to the compensator, Y is the output, s is the complex Laplace transform variable, z is the zero frequency, and p is the pole frequency. The pole and zero can both be negative and generally are both negative. In a lead controller, the pole is left of the zero in the Argand plane, $|z|<|p|$, while in a lag controller $|z|>|p|$. A lead-lag controller includes a lead controller cascaded with a lag controller. The overall transfer function can be written as:

$$\frac{Y}{X} = \frac{(s-z_1)(s-z_2)}{(s-p_1)(s-p_2)}$$

Generally, $|p_1|>|z_1|>|z_2|>|p_2|$, where $z_1$ and $p_1$ are the zero and pole of the lead controller, and $z_2$ and $p_2$ are the zero and pole of the lag controller. The lead controller provides a phase lead at high frequencies. This shifts the poles to the left, which enhances the responsiveness and stability of the system. The lag controller provides phase lag at low frequencies which reduces the steady state error.

The precise locations of the poles and zeros depend on both the desired characteristics of the closed loop response and the characteristics of the system being controlled. However, the pole and zero of the lag controller should be close together so as not to cause the poles to shift right, which could cause instability or slow convergence. Since their purpose is to affect the low frequency behavior, they should be near the origin.

Electric power transmission and distribution systems or networks include high-voltage tie lines for connecting geographically separated regions, medium-voltage lines, and substations for transforming voltages and switching connections between lines. For managing the network, it is known in the art to utilize Phasor Measurement Units (PMU). PMUs provide time-stamped local information about the network, such as currents, voltages and load flows. A plurality of phasor measurements collected throughout the network by PMUs and processed at a central data processor provide a snapshot of the overall electrical state of the power system.

The article "Application of FACTS Devices for Damping of Power System Oscillations", by R. Sadikovic et al., Proceedings of the Power Tech Conference 2005, Jun. 27-30, 2005, St. Petersburg RU, is incorporated herein for all purposes by way of reference. This article addresses the selection of the proper feedback signals and the subsequent adaptive tuning of the parameters of a power oscillation damping (POD) controller in case of changing operating conditions. It is based on a linearized system model, the transfer function G(s) of which is expanded into a sum of N residues:

$$G(s) = \sum_{i=1}^{N} \frac{R_i}{(s - \lambda_i)}$$

The N eigenvalues $\lambda_i$ correspond to the N oscillation modes of the system, whereas the residue $R_i$ for a particular mode gives the sensitivity of that mode's eigenvalue to feedback between the output and the input of the system. It should be noted that in complex analysis, the "residue" is a complex number which describes the behavior of line integrals of a meromorphic function around a singularity. Residues may be used to compute real integrals as well and allow the determination of more complicated path integrals via the residue theorem. Each residue represents a product of modal observability and controllability. FIG. 1 provides a graphical illustration of the phase compensation angle $\phi_c$ in the s-plane caused by the POD controller in order to achieve the desired shift $\lambda_k = \alpha_k + j \cdot \omega_k$ of the selected/critical mode k, where $\alpha_k$ is the modal damping and $\omega_k$ is the modal frequency. The resulting phase compensation angle $\phi_c$ is obtained as the complement to $+\pi$ and $-\pi$, respectively, for the sum of all partial angle contributions obtained at the frequency $\omega_k$ starting from the complex residue for mode $\lambda_k$, input I and output j, $\text{Res}_{ji}(\lambda_k)$, all employed (low- and high-pass) prefilters. $\phi_R$ is the angle of residue and $\phi_F$ is the phase shift caused by the prefilters.

Thus, it is known to utilize local feedback signals in power network control systems. However, it is considered that power network control systems based on remote feedback signals may lead to substantial improvements in terms of damping unwanted electromechanical oscillations. However, there is a disadvantage associated with remote feedback signals. For instance, remote signals are acquired by PMUs at distant geographical locations and sent via communication channels, which are potentially several thousand kilometers in length, to the controller. The remote signals may also pass through a wide-area data concentrating platform. Consequently, there may be permanent time delays in the feedback loop. It is known that such time delays may destabilize the feedback loop.

SUMMARY

An exemplary embodiment of the present disclosure provides a method for compensation of a time delay in remote feedback signals in power system control. The exemplary method includes determining a time delay at a frequency $\omega_k$ of the remote feedback signals, where k represents an oscillatory mode characterised by parameters of a transfer function of the power system. The exemplary method also includes converting the time delay into a phase shift, and calculating four compensation angles from the phase shift, the compensation angles constituting the angles of the transfer function. In addition, the exemplary method includes constructing a Nyquist diagram of each compensation angle, and determining a preferred compensation angle based on analysis of the four Nyquist diagrams. Furthermore, the exemplary method includes applying the preferred compensation angle to shift the oscillatory mode k by compensating the time delay in the remote feedback signals.

An exemplary embodiment of the present disclosure provides an electric power control system. The exemplary system includes at least one phasor measurement unit equipped with transceiving means, and a controller equipped with transceiving means. The exemplary system also includes a global clock for synchronizing the controller with the at least one phasor measurement unit utilizing the transceiving means. The global clock is arranged such that the controller is configured to determine a time delay of the system on a continuous basis.

An exemplary embodiment of the present disclosure provides a controller for compensating a time delay in remote feedback signals in a power system. The exemplary controller has a transfer function and includes means for receiving and timestamping phasors arriving from a phasor data concentrator. The phasors represent an oscillatory mode characterized by parameters of the transfer function of the power system. The exemplary controller also includes means for estimating an average time delay and age of the received phasors, and a feedback power oscillation damping loop for receiving inputs of the estimated average time delay and the timestamped phasors, and for outputting an appropriate compensating control signal.

BRIEF DESCRIPTION OF THE DRAWINGS

Additional refinements, advantages and features of the present disclosure are described in more detail below with reference to exemplary embodiments illustrated in the attached drawings, in which:

FIG. 2 illustrates an example of where different contributions of the total time delay may originate from;

FIGS. 5a-5d show Bode diagrams of the four possible solutions according to an exemplary embodiment of the present disclosure;

The reference symbols used in the drawings, and their meanings, are listed in summary form in the list of reference symbols. In principle, identical parts and/or identically functioning parts are provided with the same reference symbols in the drawings.

DETAILED DESCRIPTION

Figure 2:
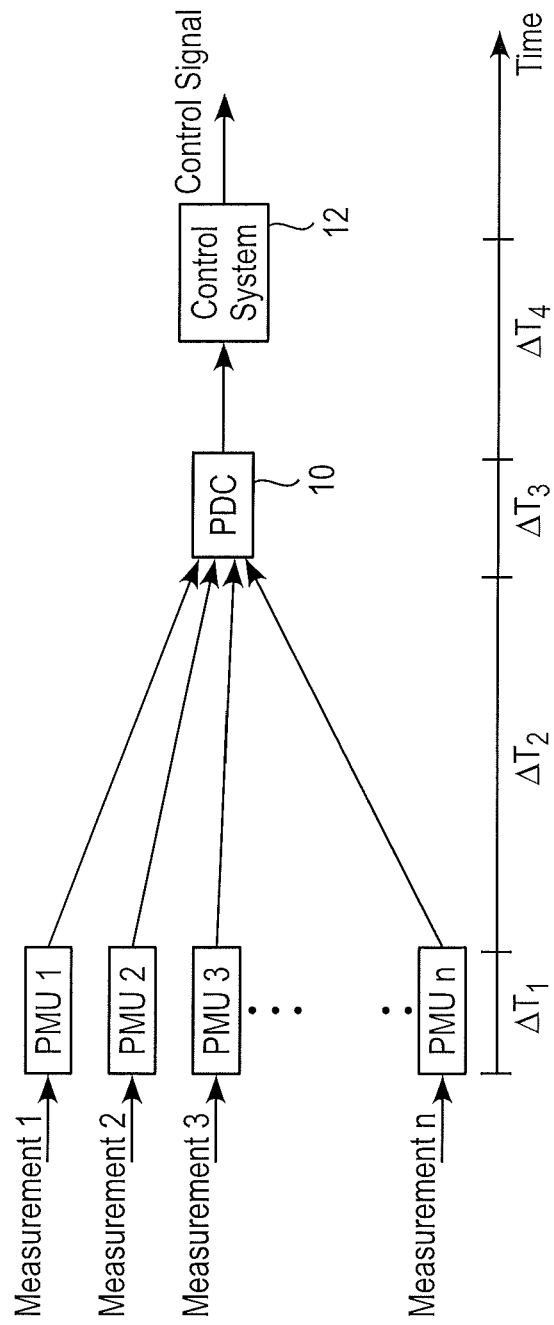

FIG. 2 illustrates an example of where different time delays may originate from. The PMUs, PMU1 to PMUn, each one being equipped with GPS synchronized clocks, will send positive sequence phasors at equidistant points in time, e.g. every 20 ms. These phasors are thus time stamped with high accuracy, and the time stamp may represent the point in time when the respective phasor was measured in the system. However, each PMU has a processing time in order to establish the phasor, which can involve a Fourier analysis, for example. Such processing time will imply a time delay $\Delta t_1$. The communication channels between the PMUs and the Phasor Data Concentrator (PDC) 10 may imply a time delay $\Delta t_2$. The PDC 10, which synchronizes the phasors, e.g., packages the phasors with the same time stamp and sends them on to the control system 12, may imply a time delay $\Delta t_3$. Although the phasors were time stamped with the same time stamp at the PMUs, they may arrive at the PDC 10 at slightly different points in time. Since the PDC 10 has to wait for the last phasor before the PDC 10 can send the data on to the control system 12, the package with synchronized phasors cannot have a smaller time delay than the largest time delay for any individual phasor. The communication between the PDC 10 and the control system 12 may imply a time delay $\Delta t_4$. Obviously, if the PDC 10 is integrated with the control system, time delay $\Delta t_4$ can be omitted. The total time delay between the point in time when the remote measurement was performed and the point in time when the measurement is available in the control system 12 may be of stochastic nature, that is, the total time delay may vary around an expected value according to some distribution. This may reduce the performance of the control system 12, and may potentially be more detrimental than having no control signal.

Exemplary embodiments of the present disclosure enable use of remote feedback signals to improve performance in electric power transmission networks in a flexible manner and with minimal additional complexity. Exemplary embodiments of the present disclosure provide a method and a controller for compensation of a time delay in remote feedback signals in a power system control, and an electric power control system, which achieve the above-described features.

An exemplary embodiment of the present disclosure provides a method for compensation of a time delay in remote feedback signals in power system control. The method includes determining a time delay of the remote feedback signals, converting the time delay into a phase shift, calculating four compensation angles from the phase shift, constructing a Nyquist diagram of each compensation angle, determining a preferred compensation angle through analysis of the four Nyquist diagrams, and applying the preferred compensation angle to the remote feedback signals. According to an exemplary embodiment, any of the features of the above-described method can be implemented in a controller, as described below. Furthermore, no additional hardware is necessary to implement these aspects of the disclosure, since parameters of an existing controller are modified.

According to an exemplary embodiment, the method can also include constructing a Bode diagram of at least two of the four compensation angles, and determining a preferred compensation angle through analysis of the Bode diagrams.

According to an exemplary embodiment, the step of determining a preferred compensation angle through analysis of the Bode diagrams can include evaluating decay of the controller's gain at higher and/or lower frequencies, respectively.

The exemplary method can also include constructing a complex frequency domain diagram of at least two of the four compensation angles, and determining a preferred compensation angle through analysis of the complex frequency domain diagram.

According to an exemplary embodiment, the step of determining a preferred compensation angle through analysis of the complex frequency domain diagrams can include evaluating eigenvalue shift with respect to other system eigenvalues.

According to an exemplary embodiment, the step of converting the time delay into a phase shift can occur at the dominant frequency.

According to an exemplary embodiment of the present disclosure, the four compensation angles are a lead compensation to +1 and a lag compensation to −1 as well as a lead compensation to −1 and a lag compensation to +1 of the phase shift signal.

According to an exemplary embodiment of the present disclosure, a controller for a power system is provided for performing the above-described method for compensation of a time delay in remote feedback signals. An exemplary embodiment of the present disclosure also provides a global clock arrangement for synchronizing the controller with predetermined phasor measurement units. The global clock can be arranged such that the time delay is determined on a continuous basis.

The controller of the present disclosure may be implemented as a processor of a digital computer executing a computer program recorded on a non-transitory computer-readable recording medium (e.g., ROM, RAM, hard disk drive, optical memory, flash memory, etc.), and/or as a hard-wired implementation using techniques such as EPROM etc.

An electric power control system is provided according to an exemplary embodiment of the present disclosure. The electric power control system includes at least one phasor measurement unit (PMU) equipped with transceiving means, a controller equipped with transceiving means, and a global clock for synchronizing the controller with the at least one phasor measurement unit utilizing the transceiving means. The global clock can be arranged such that a time delay of the system is determined on a continuous basis.

According to an exemplary embodiment, the time delay of the system can be estimated, and the estimated time delay can be utilized for phase compensation. Further, at least one parameter of the controller can be adapted on-line based on the estimated time delay.

According to an exemplary embodiment, a running average of the time delay can be determined in the controller, and the running mean value can be utilized for phase compensation.

Further, the PMU based control loop may be inactivated if the time delay is too large for the purpose of the control.

Time delays in a feedback loop of a power network controller cannot be removed. Therefore, exemplary embodiments of the present disclosure compensate for the delays. Known controllers can be used without the need to modify their structure. However, in order to compensate for the time delays, parameters of known controller are suitably adjusted in accordance with exemplary embodiments of the present disclosure.

Figure 3A:
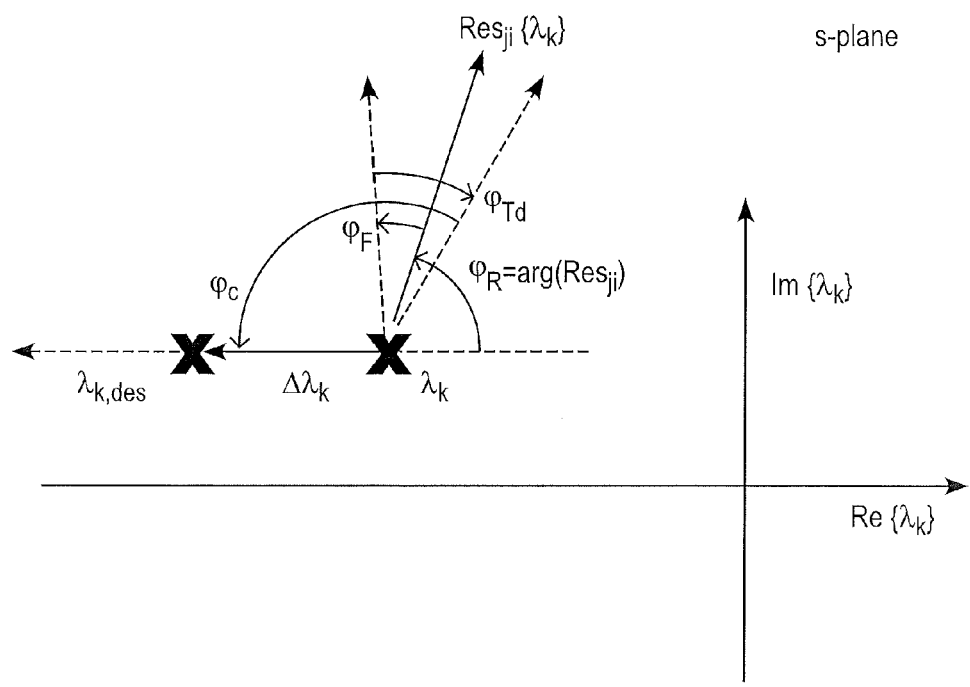
FIG. 3a graphically illustrates a pole-shift in the complex frequency domain of an exemplary POD controller in accordance with the present disclosure.

FIG. 3a graphically illustrates a pole-shift in the s-plane for a POD controller in order to achieve the desired shift $\lambda_k = \alpha_k + j \cdot \omega_k$ of the mode of interest, k, where $\alpha_k$ is the modal damping and w is the modal frequency. The resulting phase compensation angle $\phi_c$ is obtained as the complement to $+\pi$ and $-\pi$, respectively, for the sum of all partial angle contributions obtained at the frequency $\omega_k$ starting from the complex residue for mode $\lambda_k$, input i and output j, is $\text{Res}_{ji}(\lambda_k)$, all employed (low- and high-pass) prefilters. $\phi_R$ is the angle of residue and $\phi_F$ is the phase shift caused by the prefilters. $\phi_{Td}$ is the phase shift representing time delay Td at frequency $\omega_k$.

Figure 3B:
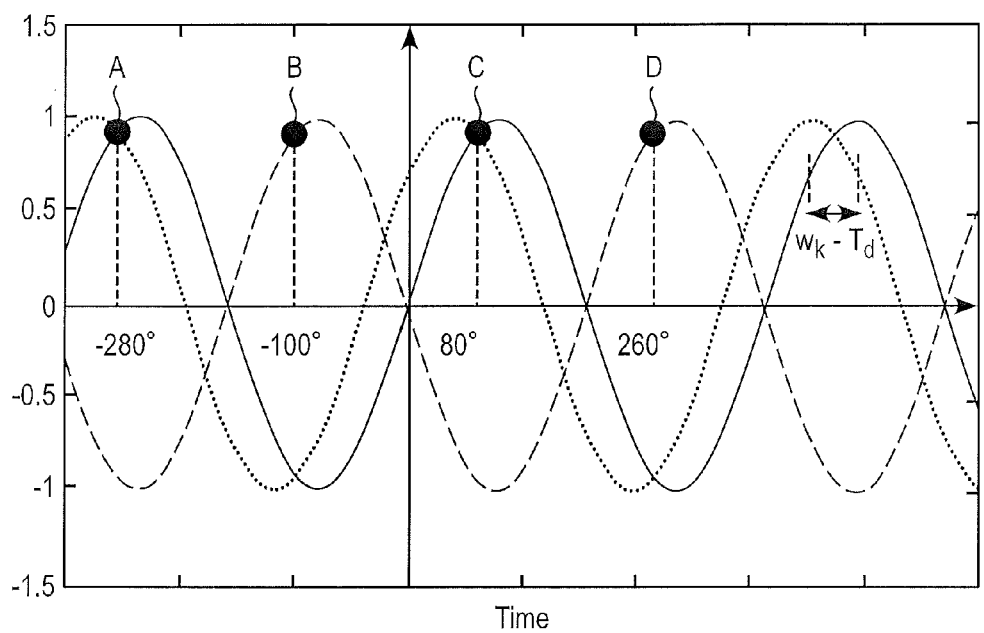
FIG. 3b graphically illustrates the delayed measured signal and four possible solutions (A, B, C and D) for the compensation of the time delay in accordance with an exemplary embodiment of the present disclosure.

The adjustment of the controller parameters can be determined in the following manner. With reference to FIG. 3b, a feedback signal is denoted by the dotted oscillating line. For simplicity, an undamped sine wave is shown. The feedback signal is phase shifted from the oscillating signal, which is represented by a solid line. The phase shift between the signal and the feedback signal is ($\omega_k \cdot Td$), where $\omega_k$ is the frequency of the mode being damped and Td is the time delay. Therefore, the time delay may be described as a phase shift at the oscillatory frequency of interest. It can be seen in FIG. 3b that the time delay corresponds to lagging 60° at the dominant frequency ω. The related modified compensation angles are calculated from the residue, phi. In this example, phi is 80°. The four solutions for the modified compensation angle which compensate for the phase shift are described as: lag to +1, lag to −1, lead to +1, lead to −1. With reference to FIG. 3b, the four solutions are graphically illustrated by the four points on the waves denoted as A, B, C, D, respectively. The actual values in this example can be seen to be −280°, −100°, 80°, 260°, respectively.

The next step in the adjustment of the controller parameters of the present disclosure utilizes Nyquist diagrams. A Nyquist diagram is used in automatic control and signal processing for assessing the stability of a system with feedback. It is represented by a graph in which the gain and phase of a frequency response are plotted. The plot of these phasor quantities shows the phase and the magnitude as the distance and angle from the origin. The Nyquist stability criterion provides a simple test for stability of a closed-loop control system by examining the open-loop system's Nyquist plot (e.g., the same system including the designed controller, although without closing the feedback loop). In accordance with an exemplary embodiment of the present disclosure, the four solutions are plotted on four Nyquist diagrams so that the optimal solution can be readily determined. FIGS. 4a-4d show an example of four such control solutions.

Figure 4B:
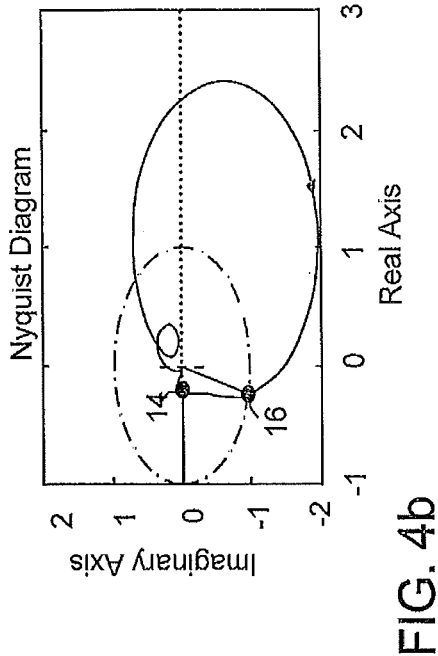
FIGS. 4a-4d show Nyquist diagrams of the four possible solutions according to an exemplary embodiment of the present disclosure.
Figure 4D:
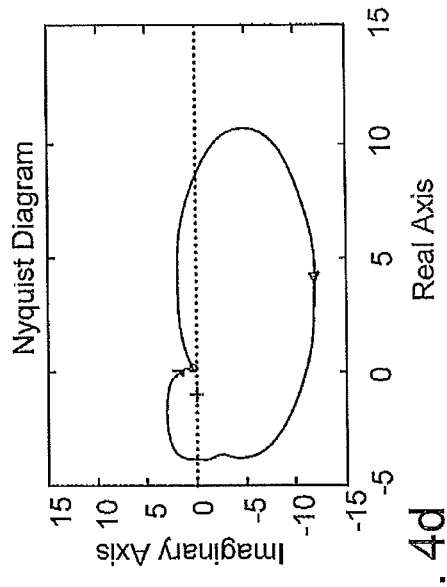
Figure 4A:
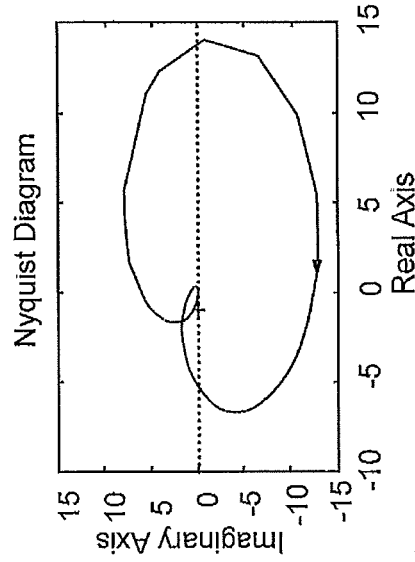
Figure 4C:
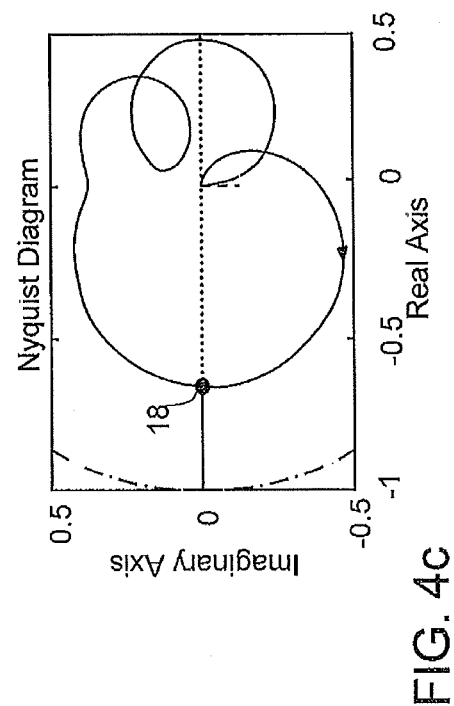

In FIGS. 4a and 4d, the control solutions are not stable because the route of the plot encircles the stability point −1,0. FIG. 4b shows a Nyquist diagram of the first stable control solution based on remote feedback signals. The black point 14 near the real axis represents the gain stability margin and the black point 16 on the unit circle indicates the phase stability margin. The route of the plot forms a clear loop which shows that the control system will have a relatively high stability margin. FIG. 4c shows a Nyquist diagram of the second stable control solution of the example in FIGS. 3a and 3b. The black point 18 near the real axis represents the gain stability margin. The phase stability margin is infinite in this case, as there is no intersection with the unit circle. The route of the plot forms a clear loop which shows that the control system will also have a high stability margin. The dot-dash line around zero represents the unit circle.

The Nyquist diagrams for the four solutions are compared in order to determine the single solution having the highest stability for the control system. It should be noted that all four solutions are compensating the same mode, and they are designed to achieve the same eigenvalue/pole shift of the critical oscillatory mode in the s-plane. However, due to the eigendynamics of the controller, each resulting closed-loop solution has totally different properties which are visible in the Nyquist diagrams shown in FIGS. 4a-4d. Thus, the influence on the closed loop system behavior can be different for each solution and it may be possible to clearly identify the single solution having the highest stability for the control system. However, if none of the solutions can be identified as the best solution utilizing the Nyquist diagrams, then a second stage in the analysis is pursued.

In this second stage, the Bode diagram of each of the solutions is constructed. A Bode diagram is a combination of a Bode magnitude plot above a Bode phase plot. A Bode magnitude plot is a graph of log magnitude versus frequency, plotted with a log-frequency axis, to show the transfer function or frequency response of a linear, time-invariant system. The magnitude axis of the Bode plot is usually expressed as decibels, that is, twenty times the common logarithm of the amplitude gain. With the magnitude gain being logarithmic, Bode plots make multiplication of magnitudes a simple matter of adding distances on the graph (in decibels), since log (a·b)=log(a)+(b). A Bode phase plot is a graph of phase versus frequency, also plotted on a log-frequency axis, which can be used in conjunction with the magnitude plot, to evaluate how much a frequency will be phase-shifted. For example, a signal described by: A sin (ωt) may be attenuated but also phase-shifted. If the system (e.g., the controller) attenuates it by a factor x and phase shifts it by −ϕ, the signal out of the system will be (A/x) sin (ωt−ϕ). The phase shift ϕ is generally a function of frequency. Phase can also be added directly from the graphical values, a fact that is mathematically clear when phase is seen as the imaginary part of the complex logarithm of a complex gain.

Thus, Bode diagrams for the four solutions are shown in FIGS. 5a-5d and are compared in order to determine the single solution having the most preferable gain characteristics. FIG. 5a shows a Bode diagram of the first control solution based on remote feedback signals. Decaying gain at high frequencies can be observed. FIG. 5b shows a Bode diagram of the second control solution based on remote feedback signals and high gain at high frequencies can be observed. Thus, the influence on the closed loop system behavior caused by measurement noise and/or interaction with other modes will be different for each solution, and it may be possible to clearly identify the single solution having the most preferable gain characteristics. However, if none of the solutions can clearly be identified as the best solution utilizing the Bode diagrams of the designed controllers, then a third stage in the analysis is pursued.

In the third stage, the complex frequency domain graph of the control solutions may be constructed. In such a complex frequency domain graph, the x-axis represents the real part of s, which is absolute modal damping, and the y-axis represents the imaginary part of s, which is modal frequency in radians per second. The s-plane transforms are commonly known as Laplace transforms. Hence, in the s-plane, multiplying by s has the effect of differentiating in the corresponding real time domain, and dividing by s has the effect of integrating. Each point on the s-plane represents an eigenvalue or a transfer function pole.

Figure 1:
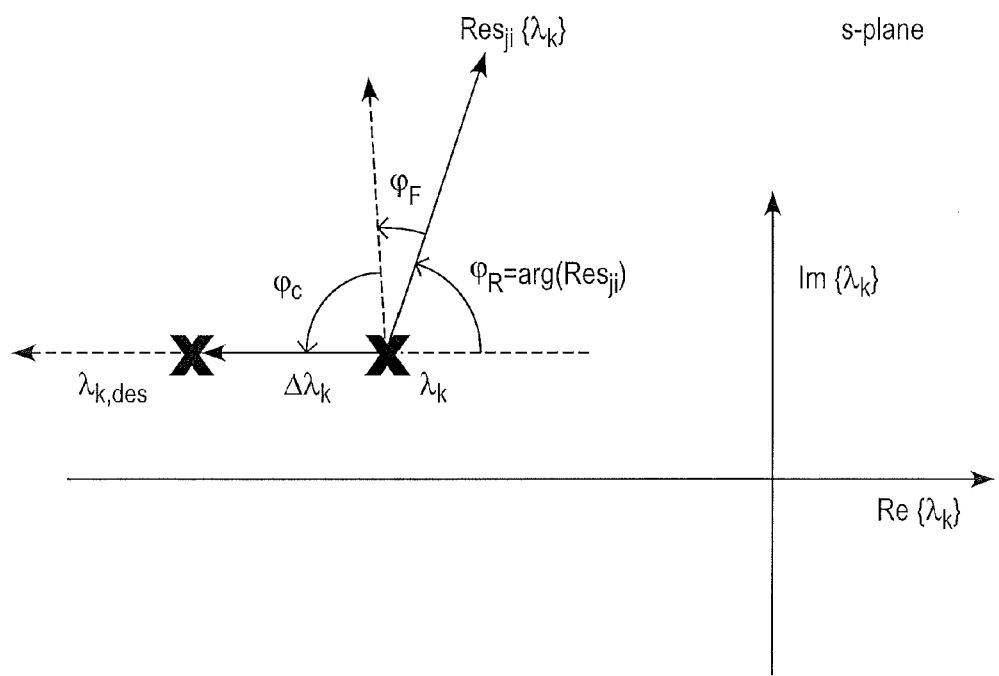
FIG. 1 graphically illustrates a theoretical pole-shift in the complex frequency domain of a known POD controller.

With reference to FIGS. 1 and 3a, an example of a control solution is illustrated. The cross denoted as $\lambda_k$ represents the situation without any damping controller, and the cross denoted as $\lambda_{k,des}$ shows an improvement in damping caused by the selected controller, because the change of the eigenvalue location is towards the left half of the s-plane.

It will be clear to the skilled person that in the majority of cases, the first stage of the analysis in which the four solutions are plotted on four Nyquist diagrams will be adequate for the controller to distinguish which is the optimal solution. In such instances, the second and third stages are not performed. However, if the comparison of the Nyquist diagrams does not reveal a single optimal solution, then the second stage can be pursued. For example, if three out of the four solutions show equally acceptable solutions, then Bode diagrams of the obtained controllers for only those three solutions are constructed and analyzed. Further, if the comparison of the Bode diagrams does not reveal a single optimal solution, then the third stage can be pursued. For example, if two out of the three compared solutions show equally acceptable solutions, then complex frequency domain graphs of only those two solutions in s-plane are constructed and the location of eigenvalues analyzed. This enables the single best solution to be determined.

Once the single best solution for the compensation angle has been determined (e.g., in the controller), the phase shift (representative of the time delay) can be rectified. As a result, the closed loop control provides similar performance to a system in which no time delays are present in the feedback loop.

Figure 6:
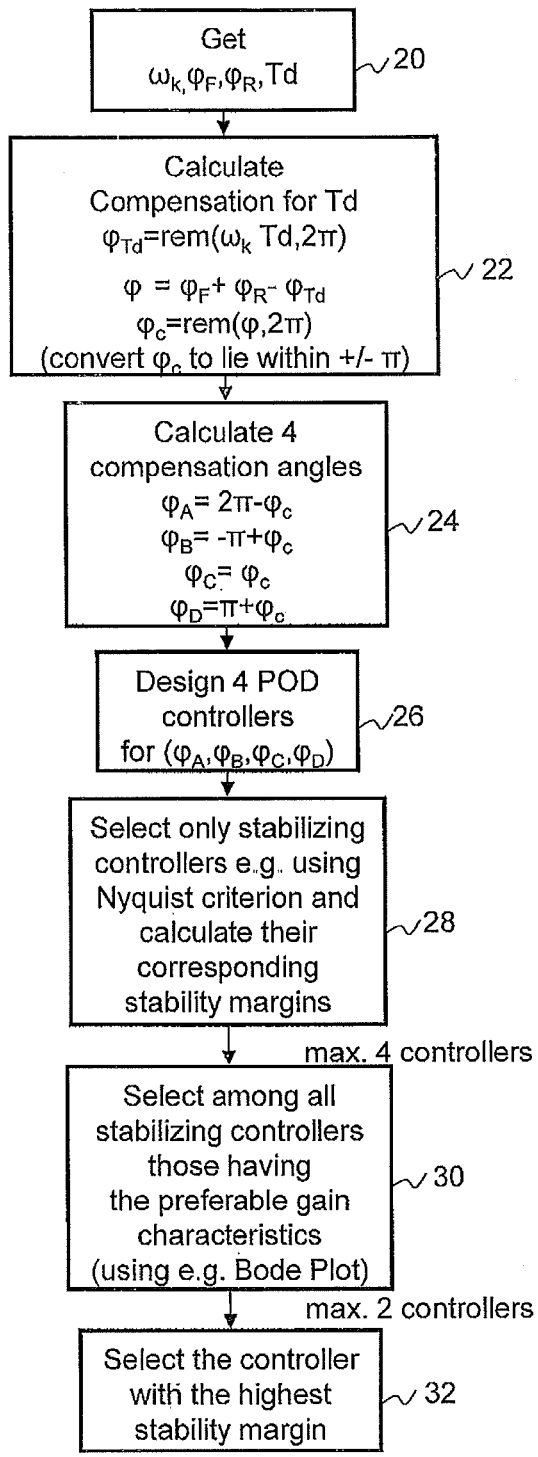
FIG. 6 is a flow diagram of an operational method of the POD controller design according to an exemplary embodiment of the present disclosure.

When in operation, the controller performs the method steps set out in FIG. 6. In a first step 20, four parameters are obtained: the frequency of the oscillatory mode to be damped $\omega_k$, phase shift caused by the prefilters $\phi_F$, the phase shift caused by the residue angle $\phi_R$, and the time-delay in the control loop Td. In a second step 22, the total compensation angle $\phi_c$ considering the effect caused by the time-delay is calculated in the following manner:

$$\phi_{Td} = \text{rem}(\omega_k \cdot Td, 2\pi)$$

$$\phi = \phi_F + \phi_R - \phi_{Td}$$

$$\phi_c = \text{rem}(\phi, 2\pi)$$

where rem (x, y) is the remainder after division x/y.

In a third step 24, four possible compensation angles are calculated in the presented controller design procedure (leading and lagging solutions with respect to both positive and negative feedbacks are denoted as solutions A, B, C and D). The fourth step 26 of the flow diagram shows that the four potential POD controllers are designed from the four compensation angles using the lead-lag approach phasor POD or other. In a fifth step 28, the closed loop stability and the stability margin are evaluated for each of the four solutions. The controller(s) having the highest stability margin are selected by using, for example, Nyquist diagrams. In the sixth step 30, this selection may be combined with the evaluation of the dynamic behaviour of the POD controller itself. A potential controller solution with decaying gain in high frequency range (lagging) or with decaying gain in low frequency range (leading) is selected depending on its possible interactions with other modes or controllers. This is determined through creating a plot of the gain characteristics, for example, a Bode plot. In a final step 32, the potential controller solution with the highest stability margin is selected.

The original input data for this method is obtained through repeated analysis of a power system from measured data over a predetermined period of time (a model is created from this data) or from an existing power system model, and the process described in the flow diagram of FIG. 6 is executed upon this model by the controller. Namely, the first action to be executed on the model comprises obtaining the parameters $\omega_k$, $\phi_F$, $\phi_R$, and Td.

According to an exemplary embodiment of the present disclosure, at the end of the procedure, the optimal compensation angle is selected, and this optimal compensation angle is applied to the feedback signals through adjusting the parameters of the lead-lag controller.

In accordance with an exemplary embodiment, the controller of the present disclosure may be run on a wide-area monitoring and control platform. In a further exemplary embodiment, the controller of the present disclosure may be run on a PMU.

In accordance with another exemplary embodiment, the controller of the present disclosure may be run on a FACTS device, specifically the low level power electronics control platform for the FACTS device, or alternatively on a fast acting device such as an AVR or a direct load modulator.

It will be apparent to the skilled man that the controller of the present disclosure may be hardwired or implemented as a computer program.

Figure 7:
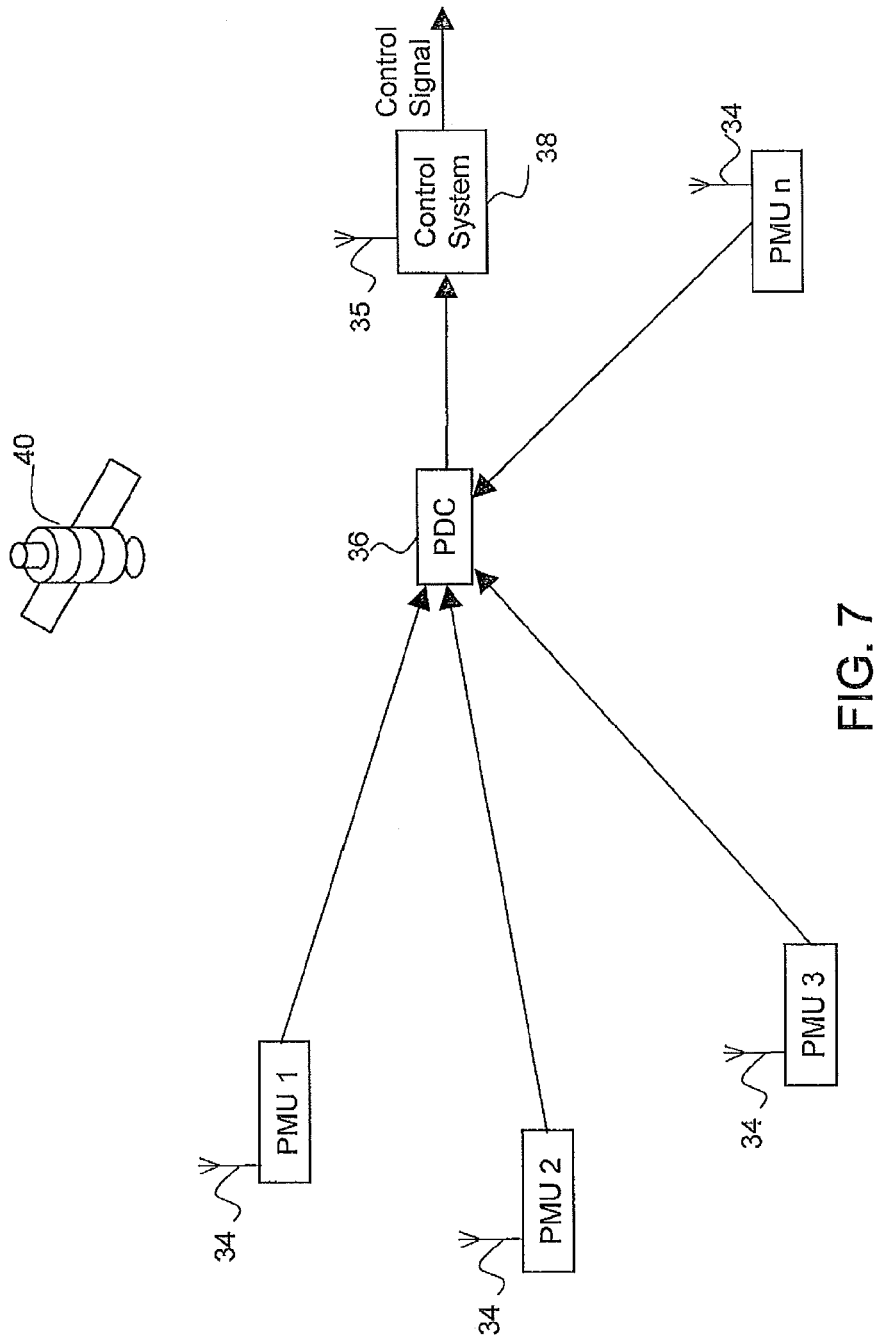
FIG. 7 schematically illustrates a power system control environment integrating a global clock according to an exemplary embodiment of the present disclosure.

FIG. 7 schematically illustrates a power system control environment integrating a global clock. In the following way it is possible to estimate the total time delay in run time. A plurality of PMUs, PMU 1 to PMU n, and a control system are all equipped with a transceiving means (e.g., a transceiver) 34, 35. Further, each PMU has a standard coupling to a phasor data concentration PDC platform 36. In turn, the PDC is coupled to the control system 38. A satellite 40 provides the GPS synchronized clock system to synchronize the PMUs and the control system 38. Through provision of a global clock on the hardware platform, the time delay is determined on a continuous basis. In accordance with an exemplary embodiment, time-stamped phasor data is recorded at regular time intervals at the remote PMUs and transmitted to the control system 38. The time delay of the remote feedback signal is determined on each occasion that the time-stamped phasor data is received by the control system 38. In accordance with another exemplary embodiment, time-stamped phasor data is recorded continuously at the remote PMUs and transmitted to the control system. The time-stamped phasor data received by the control system is filtered, and time delay of the remote feedback signal is determined as a running mean value.

Figure 8:
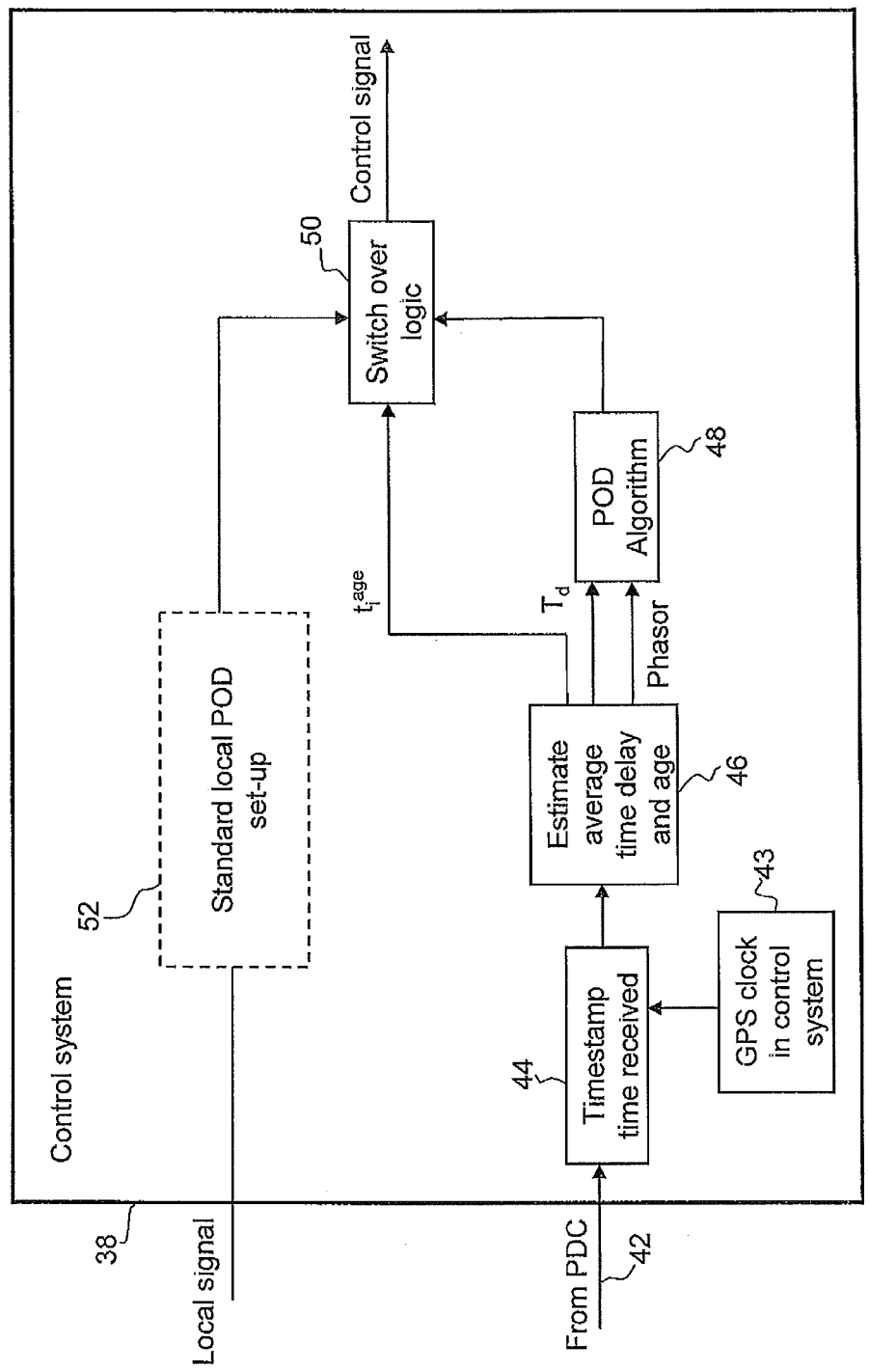
FIG. 8 shows a block diagram of a power control system integrating a global clock according to an exemplary embodiment of the present disclosure.

FIG. 8 shows an exemplary embodiment of the control system 38 for a controllable device in a power system. The control system 38 includes two feedback loops for power oscillation damping (POD), which is the same as damping of electromechanical oscillations. The feedback loop on the top corresponds to a standard configuration, where the input signal is a locally measured quantity, e.g., power flow on a local transmission line or locally derived frequency. At the bottom, the feedback POD loop according to exemplary embodiments of the present disclosure is indicated. The feedback POD loop receives synchronized and, at the time of measurement, time stamped phasors 42 from the phasor data concentrator PDC. The phasors are time stamped 44 again at the time of arrival based on a GPS clock in the control system 43. The age of the most recently received phasor is estimated, and a moving average of the time delay is estimated 46. The phasor and the moving average of the time delay are transmitted to the POD 48 such that the appropriate control signal is established. However, if the age of the most recently received phasor is too old, a switch-over to the conventional POD loop based on local measurements is effected.

In summary, the size of the time delay as determined by the control system results in one of the following outcomes:

A time delay of about 10% or less of the oscillating signal period means that the control system proceeds with the control algorithm as if there was no time delay.

A substantial time delay, but of less than 100% of the oscillation signal period, means that the control system proceeds with the control algorithm an compensates for the time delay.

A time delay of 100% or more of the oscillation signal period results in the cancellation of the control algorithm to ensure that adverse effects on the power system are avoided.

According to an exemplary embodiment, the control system initially determines 50 whether the remote measurement is to be used for control or only the standard local POD setup 52.

Further, the control system of the present disclosure may intentionally delay the measurement to a predetermined larger time delay.

The skilled artisan will understand that such time-stamped phasor data and the associated calculated compensated controller parameters may be stored in a memory of the controller. When the actual time delay is determined by controller, then it is possible that the associated compensated controller parameters have already been calculated and need only be retrieved from the memory, thereby minimizing the processing in the controller.

While the foregoing description of exemplary embodiments of the present disclosure provides a system for compensation of a time delay in the field of POD control, the skilled artisan will understand that additional and/or alternative embodiments may be envisaged. For example, control schemes for remote voltage control and/or control schemes for avoiding loss of synchronism can be envisaged.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for compensation of a time delay in remote feedback signals in power system control, the method comprising:
   determining a time delay at a frequency $\omega_k$ of the remote feedback signals, where k represents an oscillatory mode characterised by parameters of a transfer function of the power system;
   converting the time delay into a phase shift;
   calculating four compensation angles from the phase shift, the compensation angles constituting the angles of the transfer function;
   constructing a Nyquist diagram of each compensation angle;
   determining a preferred compensation angle based on analysis of the four Nyquist diagrams; and
   applying the preferred compensation angle to shift the oscillatory mode k by compensating the time delay in the remote feedback signals.

2. The method according to claim 1, comprising:
   constructing a Bode diagram of at least two of the four compensation angles; and
   determining a preferred compensation angle based on analysis of the Bode diagrams.

3. The method according to claim 2, wherein the determining of the preferred compensation angle based on analysis of Bode diagrams includes evaluating decay of gain at higher frequencies.

4. The method according to claim 2, comprising:
   constructing a complex frequency domain diagram of at least two of the four compensation angles; and
   determining a preferred compensation angle based on analysis of the complex frequency domain diagram.

5. The method according to claim 4, wherein the determining of the preferred compensation angle based on analysis of the complex frequency domain diagram includes evaluating eigenvalue shift with respect to other system eigenvalues.

6. The method according to claim 1, comprising:
   constructing a complex frequency domain diagram of at least two of the four compensation angles; and
   determining a preferred compensation angle based on analysis of the complex frequency domain diagram.

7. The method according to claim 6, wherein the determining of the preferred compensation angle based on analysis of the complex frequency domain diagram includes evaluating eigenvalue shift with respect to other system eigenvalues.

8. The method according to claim 1, wherein the step of converting the time delay into a phase shift occurs at the dominant frequency.

9. The method according to claim 1, wherein the four compensation angles are a lead compensation to +1, a lag compensation to −1, a lead compensation to −1, and a lag compensation to +1 of the phase shift signal.

10. A controller for a power system, the controller comprising a processor configured to perform the method according to claim 1 for compensation of a time delay in remote feedback signals.

11. A non-transitory computer-readable recording medium having a computer program recorded thereon that causes a processor of a digital computer to compensate for a time delay in remote feedback signals in power system control, the computer program causing the processor of the computer to execute the method according to claim 1.

12. An electric power control system, the system comprising:
    at least one phasor measurement unit equipped with transceiving means;
    a controller equipped with transceiving means; and
    a global clock for synchronizing the controller with the at least one phasor measurement unit utilizing the transceiving means,
    wherein the global clock is arranged such that the controller is configured to determine a time delay of the system on a continuous basis.

13. The electric power control system according to claim 12, wherein the controller is configured to estimate time delay, and utilize the estimated time delay for phase compensation.

14. The electric power control system according to claim 13, wherein the controller is configured to have at least one parameter of the controller adapted on-line based on the estimated time delay.

15. The electric power control system according to claim 12, wherein the controller is configured to determine a running mean value of the time delay, and utilize the determined running mean value for phase compensation.

16. The electric power control system according to claim 12, wherein the at least one PMU is configured to support a remote control loop which is inactivated if the time delay is too large for purpose of the control.

17. A controller for compensating a time delay in remote feedback signals in a power system, the controller having a transfer function and comprising:
    means for receiving and timestamping phasors arriving from a phasor data concentrator, wherein the phasors represent an oscillatory mode characterized by parameters of the transfer function of the power system;
    means for estimating an average time delay and age of the received phasors; and a feedback power oscillation damping loop for receiving inputs of the estimated average time delay and the timestamped phasors, and outputting an appropriate compensating control signal.

* * * * *